US009293146B2

(12) United States Patent
Baumgarte

(10) Patent No.: US 9,293,146 B2
(45) Date of Patent: Mar. 22, 2016

(54) INTENSITY STEREO CODING IN ADVANCED AUDIO CODING

(75) Inventor: Frank M. Baumgarte, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 770 days.

(21) Appl. No.: 13/602,687

(22) Filed: Sep. 4, 2012

(65) Prior Publication Data

US 2014/0067404 A1 Mar. 6, 2014

(51) Int. Cl.

*G06F 17/00* (2006.01)
*G10L 19/02* (2013.01)
*G10L 19/008* (2013.01)

(52) U.S. Cl.

CPC ........... *G10L 19/0208* (2013.01); *G10L 19/008* (2013.01)

(58) Field of Classification Search

CPC ............................ G10L 19/002; G10L 19/008
See application file for complete search history.

(56) References Cited

U.S. PATENT DOCUMENTS

| | | | | |
|---|---|---|---|---|
| 5,850,418 | A | 12/1998 | Van De Kerkhof | |
| 6,341,165 | B1 | 1/2002 | Gbur et al. | |
| 7,209,565 | B2 | 4/2007 | Lokhoff et al. | |
| 2004/0131204 | A1* | 7/2004 | Vinton | 381/98 |

OTHER PUBLICATIONS

Baumgarte, Frank, et al., "Why Binaural Cue Coding is better than Intensity Stereo Coding", AES 112th Convention, Munich, Paper No. 5575, (May 10-13, 2002), 10 pages.
Herre, Jurgen, et al., "Combined Stereo Coding", AES 93rd Convention, San Francisco, Paper No. 3369, (Oct. 1-4, 1992),18 pages.
Herre, Jurgen, et al., "Intensity Stereo Coding", AES 96th Convention, Amsterdam, Paper No. 3799, (Feb. 26-Mar. 1, 1994), 10 pages.
Liu, Chi-Min, et al., "A New Intensity Stereo Coding Scheme for MPEG1 Audio Encoder-Layers I and II", IEEE Transactions on Consumer Electronics, vol. 42 , Issue 3, (Aug. 1996), 535-539.
Van Der Waal, Robbert G., et al., "Subband Coding of Stereophonic Digital Audio Signals", IEEE Int. Conf. Acoustics, Speech, and Signal Processing (ICASSP), (1991), 3601-3604.

* cited by examiner

*Primary Examiner* — Joseph Saunders, Jr.
(74) *Attorney, Agent, or Firm* — Blakely, Sokoloff, Taylor & Zafman LLP

(57) ABSTRACT

A system and method for selectively applying Intensity Stereo coding to an audio signal is described. The system and method make decisions on whether to apply Intensity Stereo coding to each scale factor band of the audio signal based on (1) the number of bits necessary to encode each scale factor band using Intensity Stereo coding, (2) spatial distortions generated by using Intensity Stereo coding with each scale factor band, and (3) switching distortions for each scale factor band resulting from switching Intensity Stereo coding on or off in relation to a previous scale factor band.

18 Claims, 7 Drawing Sheets

| $sfb_{Long}$ | $sfb_{Short}$ | $sfb_{Long}$ | $sfb_{Short}$ | $sfb_{Long}$ | $sfb_{Short}$ | $sfb_{Long}$ | $sfb_{Short}$ |
|---|---|---|---|---|---|---|---|
| 0 | 0 | 13 | 2 | 26 | 6 | 39 | 11 |
| 1 | 0 | 14 | 2 | 27 | 6 | 40 | 11 |
| 2 | 0 | 15 | 2 | 28 | 7 | 41 | 11 |
| 3 | 0 | 16 | 2 | 29 | 7 | 42 | 11 |
| 4 | 0 | 17 | 3 | 30 | 8 | 43 | 12 |
| 5 | 0 | 18 | 3 | 31 | 8 | 44 | 12 |
| 6 | 0 | 19 | 3 | 32 | 8 | 45 | 12 |
| 7 | 0 | 20 | 4 | 33 | 9 | 46 | 12 |
| 8 | 1 | 21 | 4 | 34 | 9 | 47 | 13 |
| 9 | 1 | 22 | 5 | 35 | 9 | 48 | 13 |
| 10 | 1 | 23 | 5 | 36 | 10 | | |
| 11 | 1 | 24 | 5 | 37 | 10 | | |
| 12 | 1 | 25 | 6 | 38 | 10 | | |

FIG. 4

| Parameter | Value |
|---|---|
| $w_{ILD,freq}$ | 1.5 |
| $w_{Spatial}$ | 0.25 |
| $w_{S,01}$ | 0.1 |
| $w_{S,10}$ | 0.01 |
| $w_{S}$ | 1.0 |
| $w_{C,smooth}$ | 0.9 |
| $w_{NMR,smooth}$ | 0.9 |
| $T_{C}$ | 0.35 |
| $T_{\sigma}$ | 1.5 |
| $\alpha$ | 1.05 |
| $\beta$ | -0.4 |
| $\gamma$ | 0.980673 |
| $\lambda$ | 0.428489 |

FIG. 6

INTENSITY STEREO CODING IN ADVANCED AUDIO CODING

FIELD

An embodiment of the invention generally relates to a system and method for coding multiple audio channels that efficiently utilize Intensity Stereo coding in the Advanced Audio Coding (AAC) standard. Other embodiments are also described.

BACKGROUND

The Moving Picture Experts Group (MPEG) standard defines how Intensity Stereo (IS) coded audio streams are decoded and how this information is represented in the incoming coded bit stream. However, the encoder processing is not standardized. Stereo and multi-channel audio signals in MPEG-AAC usually contain channel pairs (e.g. a pair of left and right channels). If a channel pair is encoded using IS coding, only one audio channel will be transmitted instead of the pair along with gain values. The transmitted audio channel will be decoded as the left output channel of the channel pair and the right channel is derived from the left channel using applied gain values transmitted in the audio bit-stream. There is one gain value transmitted in the bit stream per scale factor band (SFB) of the audio stream.

IS coding can be turned on or off independently in each SFB and each window group. The main advantage of IS coding is the bit rate savings obtained by transmitting only one channel instead of two. However, if IS coding is applied too aggressively, audible artifacts and distortions may appear that may cause an associated image to appear more narrow, objects in the scene may appear shifted, or some objects may even disappear. To avoid distortions, IS coding must be applied to SFBs and window groups in a discreet manner.

SUMMARY

An embodiment of the invention is directed to a method for selectively applying Intensity Stereo coding to an audio signal. The method makes decisions on whether to apply Intensity Stereo coding to each scale factor band of the audio signal based on (1) the number of bits necessary to encode each scale factor band using Intensity Stereo coding, (2) spatial distortions generated by using Intensity Stereo coding with each scale factor band, and (3) switching distortions for each scale factor band resulting from switching Intensity Stereo coding on or off in relation to a previous scale factor band. These costs may be represented by Intensity Stereo state costs representing costs incurred when Intensity Stereo coding is turned on in each scale factor band, time transition costs representing costs associated with Intensity Stereo coding being toggled on-to-off or off-to-on between scale factor bands, and frequency transition costs between each scale factor band. These costs are analyzed and minimized to produce a reduced sized bitstream with low distortion levels.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 4 shows a table for mapping long and short blocks at input sample rates of 44.1 kHz and 48 kHz.

FIG. 6 shows a table of example tuned parameter values.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
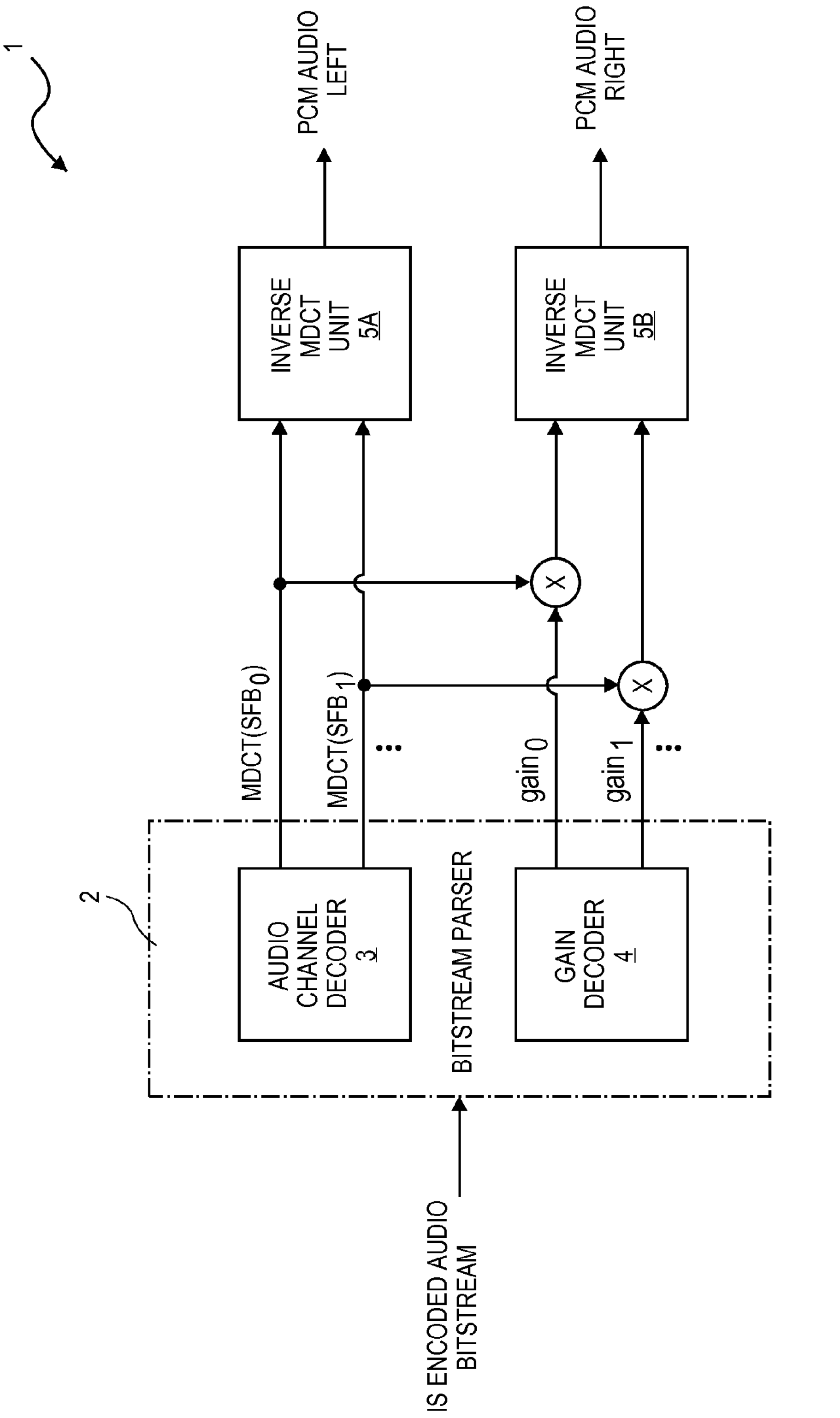
FIG. 1 shows a system for decoding a multichannel audio bitstream using Intensity Stereo coding.

FIG. 1 shows a system for decoding a multichannel audio bitstream 1 using Intensity Stereo (IS) coding. The system may be incorporated in a codec chip of an audio device such as the iPhone® or iPad® by Apple, Inc. As shown in FIG. 1, an audio bitstream that is encoded using IS coding is received by the system 1 and parsed into multiple channels by a bitstream parser 2. If a channel pair is encoded using IS coding, only one full audio channel will be transmitted instead of a pair of full audio channels. The second channel is derived from the transmitted full channel based on gain values that are transmitted along with the full audio channel in the bitstream. Although shown and described below as a left and right channel pair, the pair of channels transmitted in the bitstream may be any set of channels in an audio source. The bitstream parser 2 may include an audio channel decoder 3 and a gain decoder 4 that respectively parse the IS coded bitstream into (1) scale factors bands (SFBs) representing the left channel and (2) gain values that are used to derive the right channel. Although the SFBs shown in FIG. 1 are expressed using a modified discrete cosine transform (MDCT) other transforms may be used. For example, a discrete Fourier transform (DFT) may be used instead of a MDCT.

As shown in FIG. 1, the right channel is derived by multiplying the decoded gain values with the decoded SFBs of the left channel to generate SFB signals of the right channel. Both channels are finally transformed back to the time domain by inverse MDCT units 5A and 5B to produce pulse-code modulated left and right audio channels that may be fed into a set of speakers, a headset, or other audio transducer.

The IS encoded bitstream may include one gain value per SFB and each SFB may contain several MDCT bands (i.e. sub-bands). The bandwidths of each SFB are related to the critical bandwidth of the human ear such that the bandwidths of SFBs at low frequencies are smaller than those at high frequencies.

Figure 2:
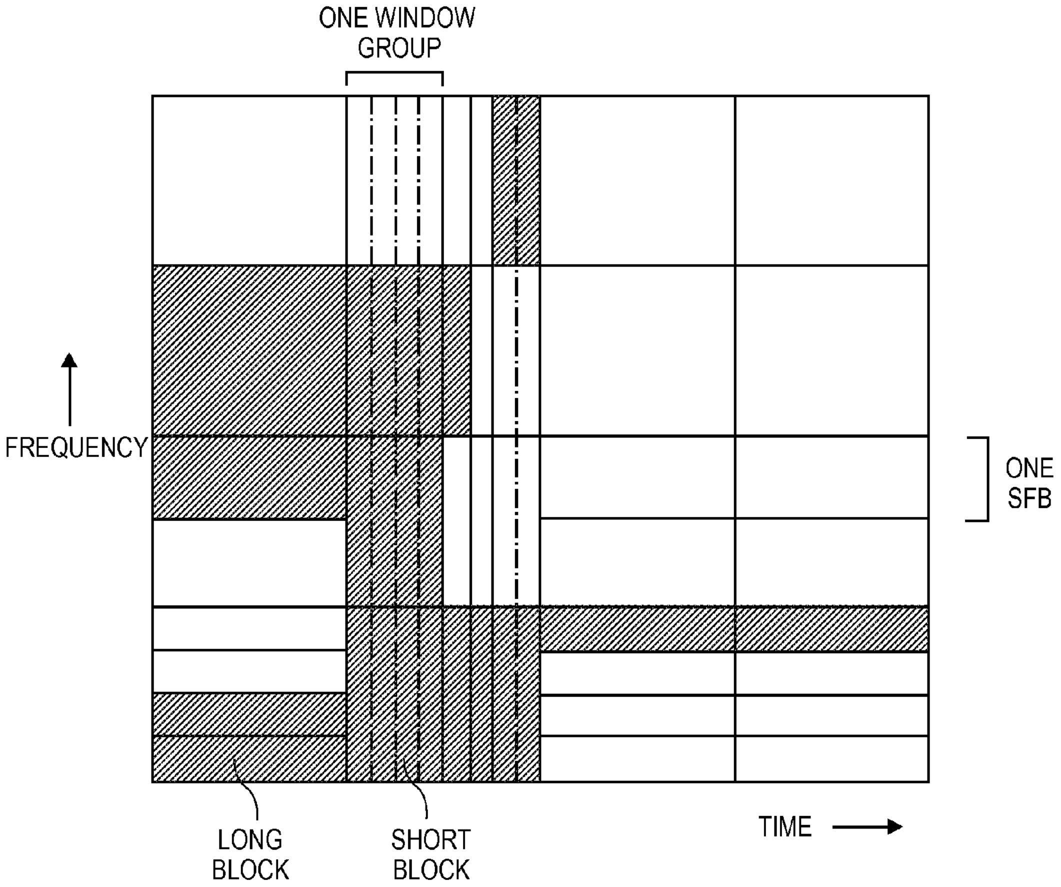
FIG. 2 shows an example segment of an Intensity Stereo coded audio signal.

IS coding may be turned on or off independently in each SFB and each window group during encoding. There may be up to 8 window groups for short windows and one window group for long windows. An example segment of an IS coded audio signal is shown in FIG. 2 with shaded tiles representing windows or SFBs where IS coding is turned on. As shown in FIG. 2, window groups, represented by segments of time in the frequency domain, may be variably sized.

One advantage of IS coding is the bit rate savings obtained by transmitting only one full channel of audio instead of two full channels. In the ideal case of a panned audio source with perfect coherence, high quality may be achieved by IS coding since the panning operation is recreated in the decoder and it is sufficient to transmit the left channel with associated gain values to generate the right channel. However, most audio material consists of recordings with various sound sources of varying degree of coherence between the channels. For such material only a careful frame-by-frame analysis can determine if the usage of IS coding is the best option or whether IS coding should be turned off in corresponding windows or SFBs.

As described above, if IS coding is applied too aggressively, audible artifacts will be noticeable in the resulting encoded bitstream. The most common audible artifacts are spatial distortions in which in associated objects in the scene may appear to be narrower, may appear shifted, or may even disappear. Additionally, audio material with more stationary content, such as harmonic tones, may exhibit noise bursts for some instances when the usage of IS coding changes from on to off or vice versa. To avoid distortions, the left and right channels are analyzed with the goal of estimating the degree of various distortions caused by IS coding. If the distortions are relatively, low IS coding is applied to corresponding windows or SFBs.

IS encoding may be divided into a few operations, including (1) generating the left channel that will be transmitted in a downmix bitstream signal; (2) estimating the IS position, i.e. the level difference between left and right channels to be transmitted to the decoder as panning gain; (3) computing a masked threshold as a basis to control the quantizer step sizes for the MDCT spectrum; (4) deciding when IS encoding is turned on or off in a window or SFB based on joint minimization of bit rate and audible distortion; and (5) generating the encoded bitstream. Deciding when IS encoding is to be applied (i.e. turned on and off) at operation (4) effects the level of distortion in a resulting downmix bitstream as will be described by way of example below.

Figure 3:
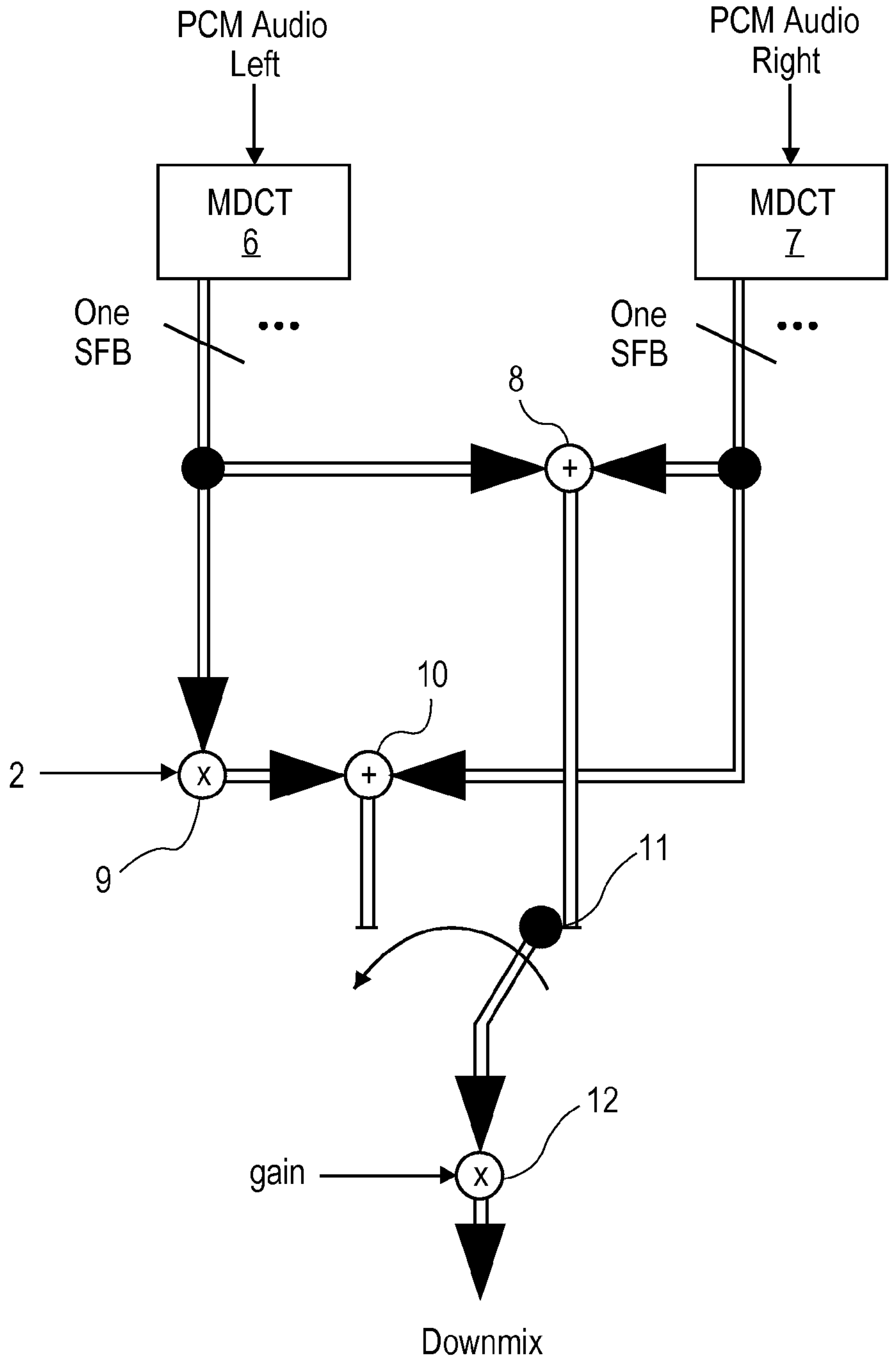
FIG. 3 shows an example system for encoding a downmix signal using Intensity Stereo coding.

Beginning with the generation of the left channel, as described above, IS coding transmits a full audio channel along with gain values in a single bitstream to represent a channel pair. FIG. 3 shows an example system for encoding the downmix signal (i.e. left channel) based on left and right audio channel for a single SFB.

As shown, the left channel and right channels are converted to the frequency domain using MDCT 6 and MDCT 7, respectively. As described above, other transforms may be used to convert the left and right audio channels to the frequency domain, including DFTs.

Following their conversion to the frequency domain, the left and right audio channels are summed using the mixer 8. In some embodiments, the sum of the two channels can be used as the downmix signal since there is usually a high coherence when IS coding is turned on. If the left and right audio channels are out of phase the sum can approach zero and the signal is lost. To prevent this ill-conditioned case, an out-of-phase condition may be detected and the left channel is scaled by a factor of two by scaler 9 before their summation by mixer 10. The detection of the out-of-phase condition toggles the switch 11 to appropriately output the signal produced by mixer 8 or the signal produced by mixer 10 that accounts for the out-of-phase condition. The signal output from the switch 11 is amplified by a gain factor g by amplifier 12 to match the energy of the louder channel with the corresponding decoded channel.

Turning to estimating the intensity position value, this value is the quantized and coded level difference between the left and right channels as described in the MPEG-AAC standard entitled "Coding of Moving Pictures Audio", ISO/IEC 13818-7. The level may be estimated from the SFB energies and may be transmitted in the bitstream.

Turning to computing the masked threshold, the psychoacoustic model computes masked thresholds for the left and right channels. For IS coding a threshold is needed for the downmix channel to control the quantization noise level of that channel. This threshold is computed from the left and right thresholds ML and MR for each SFB as follows.

$$r_L = \frac{M_L}{P_L};$$

$$r_R = \frac{M_R}{P_R}$$

$$M_{IS} = \begin{cases} r_L P_{IS} & \text{if } r_L < r_R \\ r_R P_{IS} & \text{if else} \end{cases}$$

The SFB energies for the left, right, and Intensity channels are $P_L$, $P_R$, and $P_{IS}$, respectively. As shown in the above equations, the IS masked threshold $M_{IS}$ matches the larger signal-to-masked threshold of the two left and right input channels.

Turning now to the operation of deciding when IS encoding is turned on or off in an SFB, this decision depends on various distortion estimates, bit rate estimates, and previous usage decisions as will be described below.

The bandwidths of SFBs vary since the codec can switch between long and short blocks. In long block mode there are more SFBs with smaller bandwidths than in short block mode. To more accurately compute distortion estimates, the estimates are tracked and smoothed over time in each SFB. In one embodiment, this is performed by mapping the SFB grid of the previous frame to the grid of the current frame when the codec switches block sizes. The table of FIG. 4 may be used for mapping at input sample rates of 44.1 kHz and 48 kHz according to the following function:

$$sfb_{Short}\text{mapSfbLongToShort}(sfb_{Long})$$

The table of FIG. 4 is purely an example for mapping different block sizes and in other embodiments, other tables, equations, or mapping techniques may be used.

One element of distortion may result from the fact that the audio waveform cannot be reconstructed perfectly if IS coding is used. This is in contrast to left/right and M/S coding. The error due to IS coding (neglecting MDCT quantization) may be derived by computing the right channel from the downmixed channel in a similar fashion as done in the decoder and by comparing these channels with the reference. The right channel R' after IS coding is generated from the left channel L' with the gain factor gis in the MDCT domain according to the following equation:

$$R'(k)=g_{IS}(b)L'(k)$$

The gain factor $g_{IS}$ used here by the encoder may be the same as the gain factor gis used later in a decoder. The error energy for the left and right channels may be estimated for each SFB b within the MDCT bin frequency index k through use of the following equations:

$$P_{E,L}(b) = \sum_{k \in sfb(b)} (L(k) - L'(k))^2$$

$$P_{E,R}(b) = \sum_{k \in sfb(b)} (R(k) - R'(k))^2$$

The noise-to-mask ratio for IS coding error may be computed based on the maximum of the two channels:

$$NMR_{IS}(b) = 10\log_{10}\left(\max\left[\frac{P_{E,L}(b)}{M_L(b)}, \frac{P_{E,R}(b)}{M_R(b)}\right]\right)$$

Where M is the masking threshold determined based on the psychoacoustic model. Smoothing over time results in a smoothed version of the noise to mask ratio $NMR_{IS}$. For a block index t, the smoothed $NMR_{IS}$ may be represented as:

$$NMR_{IS,smooth}(b,t) = w_{NMR,smooth} NMR_{IS,smooth}(b,t-1) + (1 - w_{NMR,smooth}) NMR_{IS}(b,t)$$

Based on the computed smooth noise-to-mask ratio $NMR_{IS,smooth}$, IS coding may be selectively applied to a corresponding $SFB_b$. If the codec switches between long and short windows, the previous NMR values may be mapped to the current SFB grid before the smoothing is applied.

The correlation between the two input channels determines the perceived spatial image width. If the correlation is high, the image width will be small. In one embodiment, the correlation may be evaluated independently in different bands by the auditory system. If IS coding is used in a band, the resulting correlation in the band will be maximized (i.e. perfectly correlated). Hence, IS coding should be used if the reference signal has high correlation. The normalized correlation of the input signal may be estimated from the energy spectrum as follows:

$$C_{LR}(b) = \frac{\sum_{k \in sfb(b)} \sqrt{P_L(k) P_R(k)}}{\sqrt{\left(\sum_{k \in sfb(b)} P_L(k)\right)\left(\sum_{k \in sfb(b)} P_R(k)\right)}}$$

Since auditory systems are more sensitive to changes at high correlations near 1.0, the normalized correlation may be mapped to a perceived correlation value that is more or less proportional to the changes heard when the correlation changes.

This may be represented by:

$$C_{LR,perc}(b) = \max(0, \{[\alpha - C_{LR}(b)]^{\beta} - \gamma\}\lambda)$$

The perceived correlation may thereafter be smoothed over time according to the following equation:

$$C_{LR,perc,smooth}(b,t) = w_{C,smooth} C_{LR,perc,smooth}(b,t-1) + (1 - w_{C,smooth}) C_{LR,perc}(b,t)$$

If the codec switches between long and short windows, the previous correlation values may be mapped to the current SFB grid before the smoothing is applied. The correlation error may be computed as:

$$C_E(b) = 1 - C_{LR,perc,smooth}(b)$$

The correlation distortion may be represented as:

$$D_{ICC}(b) = \frac{C_E(b) - T_C}{T_C}$$

In this equation, $T_C$ is the constant correlation error threshold.

The level differences between two channels of a channel pair may be the primary cue for localization. Another cue may be the time delay, which in some embodiments may be ignored. The level difference in an SFB may be represented by IS coding if it is fairly constant in the time-frequency tile. For example, if there is a considerable variation of the level difference in time and/or frequency, IS coding may result in a significantly different spatial image.

The decision whether the codec uses long or short blocks may be driven by a transient detector and associated pre-echoes. Hence, the decision may not be suited to provide the appropriate time resolution for IS coding. An example may be a situation in which the codec chooses long blocks although there are some small attacks, such as in a recording of audience applause. The individual claps of the applause signal may have different level differences that occur much faster than the frame rate can resolve.

To detect this problem, level differences may be measured based on short block MDCTs. The level differences may be represented as:

$$ILD_{Short}(b, n) = 10\log_{10}\left(\frac{\sum_{k \in sfbShort(b)} P_L(k, n)}{\sum_{k \in sfbShort(b)} P_R(k, n)}\right);$$

$$n = [1, 8]$$

Subsequently the standard deviation of the 8 short blocks per frame may be computed for each SFB. The standard deviation is an estimate of the distortion incurred when encoding the frame with a long block, because the long block will have a constant level difference for the duration of the 8 short blocks. The standard deviation may be represented as:

$$\sigma_{ILD}(b_{Short}) = \sqrt{\frac{\sum_{n \in [1,8]} [ILD(b_{Short}, n) - \overline{ILD}(b_{Short})]^2}{8}}$$

In the above calculation of standard deviation, $\overline{ILD}(b_{Short})$ may be represented as:

$$\overline{ILD}(b_{Short}) = \frac{1}{8} \sum_{n \in [1,8]} ILD(b_{Short}, n)$$

The ILD distortion associated with long block coding may be computed using the constant threshold $T_\sigma$ as:

$$D_{ILD,time}(b_{Short}) = \frac{\sigma_{ILD}(b_{Short}) - T_\sigma}{T_\sigma}$$

In another embodiment where the codec decides to use short blocks, the spectral resolution may be insufficient to resolve the level difference variation over frequencies within an SFB. To estimate the ILD errors that occur when several long block SFBs are represented by a single short block SFB, the ILDs may be compared for long and short blocks. First the long block SFBs may be computed as:

$$ILD_{Long}(b_{Long}) = 10\log_{10}\left(\frac{\sum_{k\in sfbLong(b)} P_L(k)}{\sum_{k\in sfbLong(b)} P_R(k)}\right)$$

The maximum absolute ILD difference between short and long block SFBs is found for all short blocks and all long block SFBs that map into the same short block SFB. For example, in FIG. 2 there is 1 long block that maps to eight short blocks. The maximum absolute ILD difference between short and long block SFBs may be represented as:

$$ILD_E(b_{Short})=\max(|ILD_{Long}(b_{Long})-ILD_{Short}(b_{Short},n)|_{n,b_{Long}})$$

In the above calculation of the maximum absolute ILD difference $b_{Long}$:sfbLongToShort($b_{Long}$)≡$b_{Short}$ . And the associated distortion may be estimated as:

$$D_{ILD,freq}(b_{Short})=w_{ILD,freq}\sqrt{ILD_E(b_{Short})}$$

To estimate the overall spatial distortions created by IS coding, the individual contributions of correlation distortions and level difference distortions may be combined. This may be done by a maximum operation:

$$D_{Spatial}=\max(D_{ICC},D_{ILD,freq})$$

If the codec uses long blocks, the ILD distortion due to the limited time resolution may be calculated as:

$$D_{Spatial}=\max(D_{spatial}D_{ILD,time})$$

Bit rate estimates are derived based on the signal-to-masked ratio (i.e. perceptual entropy). Perceptual entropy is the number of bits needed to encode the MDCT spectrum. This calculation may be applied to L/R, M/S, and IS coding when the masked thresholds and channel energies are available. Side information bits may not be included in the estimate. The perceptual entropy for IS coding is called $PE_{IS}$(b). If IS is turned off, the perceptual entropy estimate for either the left and right channel or the mid and side channel of M/S coding may be applied instead. In this embodiment, the perceptual entropy is called $PE_{nonIS}$(b). Perceptual entropy may be calculated for SFBs as:

$$PE(b) = 0.166\cdot 10\log_{10}\left(\frac{P(b)}{M(b)}\right)$$

If IS coding is always turned on in all SFBs it can potentially change the spatial image of the audio signal since the result may be more correlated than the reference. However, these spatial distortions are usually not very annoying to an audience and may often only be detected by direct comparison with the reference. For reference signals with very low inter-channel correlation (and wide spatial image) the change in the spatial image due to IS coding can be quite dramatic. Hence it may be necessary to adaptively turn IS coding on only when appropriate.

When turning IS coding on and off over time, audible artifacts may result due to the sudden spatial image change and due to the IS coding errors mentioned above. The IS coding errors may form a noise burst because the overlap-add operation in the decoder operates on two pieces that do not perfectly fit together. The consequence is that there is a mismatch that results in a reconstruction error. A strategy to avoid these IS coding switching distortions is to minimize switching over time and to switch in time instances when the error is small.

Another problem may arise from the fact that the SFBs have different resolutions for long and short blocks as illustrated in FIG. 2. In one embodiment, IS coding is kept on or off over time in a given SFB to overcome this problem. However, if the codec switches from long to short blocks, a problem may arise as SFB bandwidths change. Several SFBs of the long block mode correspond to one SFB in short block mode. Therefore, the frequency range of those SFBs in long block mode will have either IS coding on or IS coding off when switching to short blocks. Thus, there can be distortions due to IS coding switching on/off. A strategy to avoid this problem is to make a common IS coding decision for all SFBs in long block mode that span a SFB in short block mode. With this strategy switching artifacts can be minimized as the IS coding decision can be consistent over time even when switching between long and short blocks.

Based on the above description, the decision whether to use IS coding for a given SFB depends on a number of factors such as:

The number of bits necessary to encode the SFB using IS coding vs. non-IS coding;

Spatial distortions generated by the usage of IS coding; and

Switching distortions resulting from switching IS coding from off to on or from on to off over time.

An efficient way to jointly trade off all these factors is by employing a dynamic program. The dynamic program may take into account the dependencies of the decision for the current SFB on the previous SFB in time and frequency. This may be necessary because switching distortions may only occur if the IS coding decision changes from the previous block. Moreover, the number of bits for IS coding also depends on the number of IS codebook indices that need to be transmitted, one for each section that has IS coding. Each section can contain several SFBs.

Figure 5:
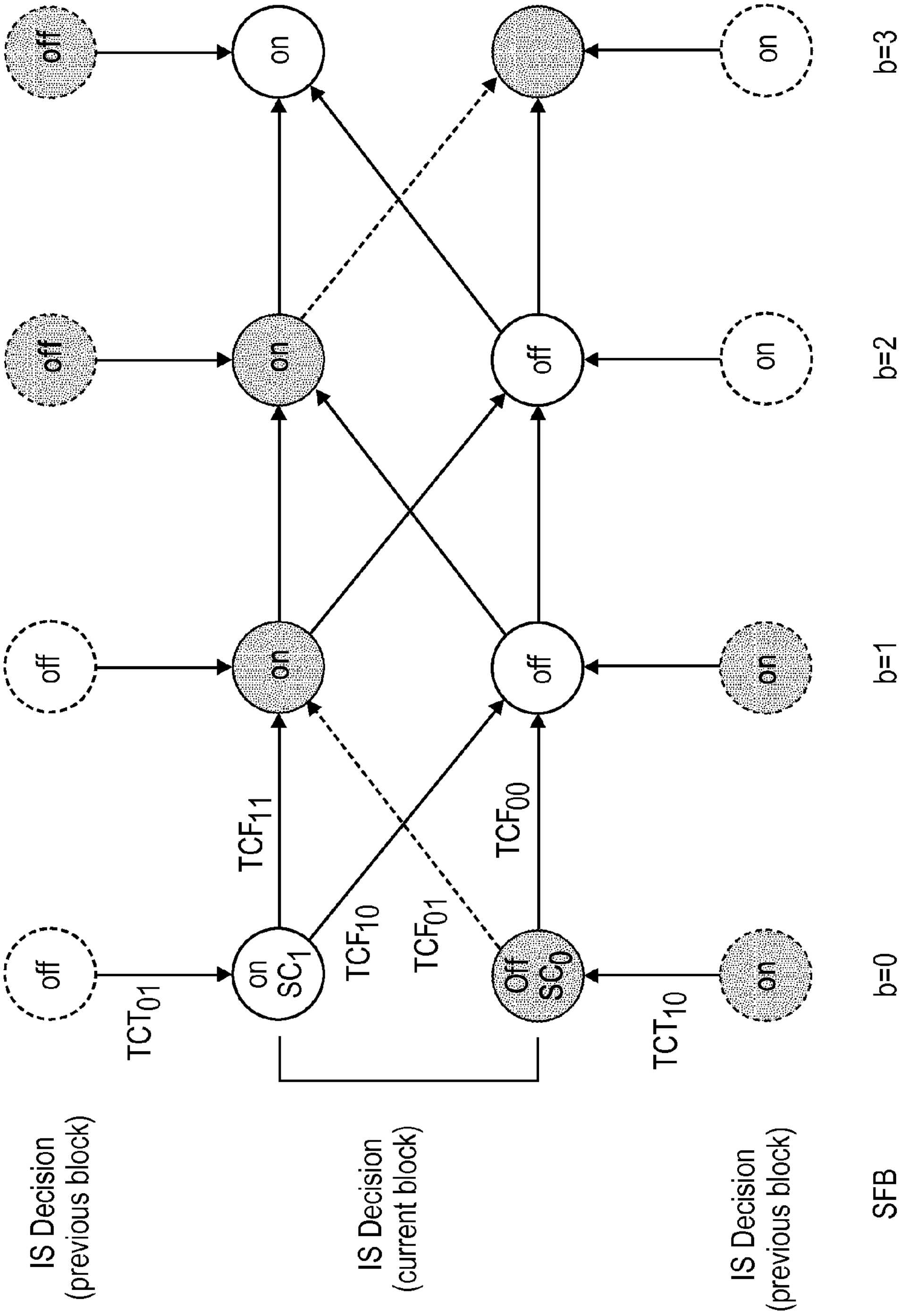
FIG. 5 shows a lattice structure outlining a dynamic program for making Intensity Stereo coding decisions.

FIG. 5 shows a lattice structure outlining a dynamic program for making IS coding decisions according to one embodiment. The IS coding decisions for a current block in the lattice structure are shown as solid circles and previous blocks are shown as dashed circles. The decisions of the previous block are known and the costs associated with any combination of IS coding decisions of the current block are evaluated and optimized. The costs can be divided into state costs and transition costs. The state cost $SC_0$ for IS coding off is zero. When IS coding is on, the state cost includes the estimate of the bit rate change, correlation distortion and switching IS error. The state cost for $SC_1$ for IS coding on may be represented as:

$$SC_1 = \frac{PE_{IS} - PE_{nonIS}}{PE_{nonIS}} + w_{Spatial}D_{Spatial} + w_s\max(0, NMR^2_{IS,smooth})$$

The weighting factors $W_{Spatial}$ and $W_S$ determine the relative contributions of the spatial distortions and IS coding errors.

The transition costs in the time direction (TCT) from the previous block to the current block are incurred if the IS coding decision changes. If the decision changes from IS coding off to on, a cost is added for the switching distortion:

$$TCT_{01}=w_{S,01}\max(0,NMR_{IS}^2)$$

If the decision changes from IS coding on to off, the following cost is added:

$$TCT_{10}=w_{s,10}\max(0,NMR_{IS}^2)$$

The frequency transition costs in the frequency direction (TCF) are considered when moving from one SFB to the next. If the IS coding decision does not change, there is no added cost:

$$TCT_{00}=TCT_{11}=0$$

If the IS coding decision changes from one SFB to the next, a 4-bit codebook index must be transmitted. Hence, the added cost is:

$$TCT_{01}=TCT_{10}=\frac{4}{PE_{nonIS}}$$

As described above, FIG. 5 is a lattice structure showing the contribution of various costs in the dynamic program depending on the IS coding decisions in the current and previous SFBs. The optimum IS coding decisions are shown as shaded circles. The costs associated with the dashed path are the total costs of the optimum decisions.

The total costs are minimized by the dynamic program when the lattice is processed from left to right. First the TCT costs and SC costs are accumulated along the different paths. There are two possible paths to reach an IS decision in a given SFB. Only the path with the minimum cost is kept, the other one is discarded when each SFB is processed. When reaching the final SFB, the IS coding decision with the lowest cost is chosen in that SFB and the optimum path is traced back to the first SFB.

The IS decision can be tuned by modifying the parameters in FIG. 6. Increased weights can emphasize certain distortions or bit savings to bias the result of the dynamic program accordingly. In the tuning process it is important to identify by listening or analysis what type of distortion is present so that the appropriate weights can be modified. A list of tuned parameter values is included in FIG. 6.

If the codec switches between long and short windows, the SFB grid changes. Since the dynamic program uses the previous IS state, the SFBs of the previous block must be mapped to the current grid if there is a window size change before the dynamic program can be applied.

Although described above in relation to IS coding, the lattice structure of FIG. 5 may be similarly applied using other audio coding processes and techniques. For example, the lattice structure may be used to selectively apply other joint coding processes to SFBs of an audio signal such as M/S stereo coding and Joint frequency coding. The use of IS coding is purely illustrative and is not intended to limit the scope of the application.

Figure 7:
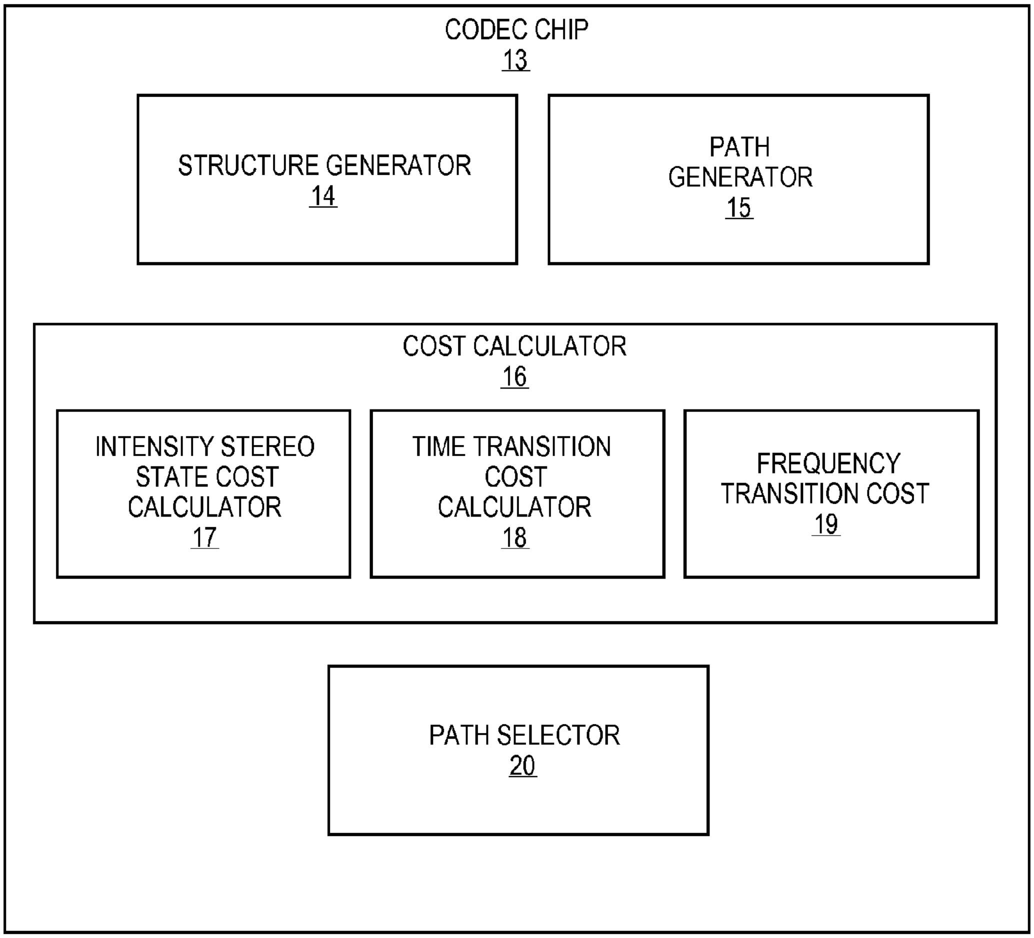
FIG. 7 shows a codec chip for selectively apply Intensity Stereo coding to an audio signal

FIG. 7 shows a codec chip 13 according to one embodiment. The codec chip 13 may selectively apply IS coding to SFBs of an audio signal based on the dynamic program described above. The codec chip 13 may include a structure generator 14 for generating a lattice structure that represents costs associated with selectively applying IS coding to SFBs. The lattice structure may be represented as one or more data structures that define the SFBs and each possible decision for applying IS coding to the SFBs.

The codec chip 13 may include a path generator 15 for generating a plurality of paths through the lattice structure. The paths define a set of decisions for applying IS coding in each SFB. For example, the path may be defined by a separate decision for each SFB indicating in which SFBs IS coding is applied.

The codec chip 13 may include a cost calculator 16 for calculating costs associated with each of the plurality of paths. In one embodiment, the costs may include an IS state cost representing costs incurred when IS coding is turned on in a SFB, a time transition cost representing costs incurred when IS coding is toggled on-to-off or off-to-on between SFBs, and frequency transition costs representing costs incurred between each SFB. Each of these costs may be calculated by an IS state cost calculator 17, a time transition cost calculator 18, and a frequency transition cost calculator 19, respectively, using the methods and equations provided above.

The codec chip 13 may include a path selector 20 for selecting one of the paths generated by the path generator 15. The selected path may be a path with a minimum cost. For example, the selected path may be a path with the lowest IS state cost, time transition cost, and frequency transition cost. The selected path is thereafter used to encode the audio signal by using the IS coding decisions defined in the selected path to generate a reduced sized bitstream with low distortion levels.

Although described above in relation to IS coding, the code chip 13 may be similarly applied using other audio coding processes and techniques. For example, the codec chip 13 may selectively apply other joint coding processes to SFBs of an audio signal such as M/S stereo coding and Joint frequency coding. The use of IS coding is purely illustrative and is not intended to limit the scope of the codec chip 13.

To conclude, various aspects of an intensity stereo coding system have been described. As explained above, an embodiment of the invention may be a machine-readable medium such as one or more solid state memory devices having stored thereon instructions which program one or more data processing components (generically referred to here as "a processor" or a "computer system") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for selectively applying a coding process to an audio signal, comprising:

generating a lattice data structure representing costs for selectively applying the coding process to scale factor bands;

generating a plurality of paths through the lattice data structure;

calculating time transition costs incurred between scale factor bands according to the selective application of the coding process for each of the plurality of paths; and selecting a path with a minimum cost from the plurality of paths.

2. The method of claim 1, further comprising calculating state costs incurred when the coding process is turned on in a scale factor band.

3. The method of claim 2, wherein the state costs are calculated using $$\frac{PE_{IS} - PE_{nonIS}}{PE_{nonIS}} + w_{Spatial} D_{Spatial} + w_s \max(0, NMR^2_{IS,smooth}),$$

wherein $w_{Spatial}$ and $D_{Spatial}$ represent spatial distortions, $w_s$ represents switching distortions, $PE_{IS}$ represents a bit rate estimate when the coding process is turned on, $PE_{nonIS}$ represents a bit rate estimate when the coding process is turned off, $NMR_{IS,\ smooth}$ represents a noise-to-mask ratio for coding errors smoothed over time.

4. The method of claim 1, wherein the time transition costs when the coding process is toggled between scale factor bands are equal to $w_s \max(0, NMRA_{IS}^2)$, where $w_s$ represent spatial distortions when the coding process is toggled between scale factor bands.

5. The method of claim 1, further comprising calculating frequency transition costs between each scale factor band.

6. The method of claim 5, wherein the frequency transition costs are equal to zero when the coding process is constant between scale factor bands and is equal to $$\frac{4}{PE_{nonIS}}$$

when the coding process is toggled on-to-off or off-to-on between scale factor bands.

7. The method of claim 5, wherein selecting the path with the minimum cost from the plurality of paths comprises:

calculating state costs incurred when the coding process is turned on in a scale factor band;

calculating a total cost for each of the plurality of paths based on the state costs, the time transition costs, and the frequency transition costs; and selecting the path from the plurality of paths with a minimum total cost.

8. The method of claim 7, wherein each of the plurality of paths define use of the coding process in each scale factor band of the audio signal.

9. The method of claim 1, wherein the coding process is Intensity Stereo coding.

10. A codec chip to selectively apply a coding process for each scale factor band of an audio signal, comprising:

a structure generator for generating a lattice data structure that represents costs associated with selectively applying the coding process to scale factor bands;

a path generator for generating a plurality of paths through the lattice data structure;

a time transition cost calculator for calculating costs incurred between scale factor bands according to the selective application of the coding process for each of the plurality of paths; and a path selector for selecting a path with a minimum cost from the plurality of paths.

11. The codec chip of claim 10, further comprising a state cost calculator for calculating costs incurred when the coding process is turned on in a scale factor band.

12. The codec chip of claim 10, further comprising a frequency transition cost calculator for calculating frequency transition costs between each scale factor band.

13. The codec chip of claim 10, wherein the coding process is Intensity Stereo coding.

14. An article of manufacture, comprising:

a machine-readable non-transitory storage medium that stores instructions which, when executed by a processor in a computing device, selects whether to toggle a coding process on or off for each scale factor band of an audio signal by performing a method comprising:

generating a lattice data structure representing costs for selectively applying the coding process to scale factor bands;

generating a plurality of paths through the lattice data structure;

calculating time transition costs incurred between scale factor bands according to the selective application of the coding process for each of the plurality of paths; and selecting a path with a minimum cost from the plurality of paths.

15. The article of manufacture of claim 14, wherein the method performed by the processor further comprises calculating state costs incurred when the coding process is turned on in a scale factor band.

16. The article of manufacture of claim 14, wherein the method performed by the processor further comprises calculating frequency transition costs between each scale factor band.

17. The article of manufacture of claim 16, wherein the method performed by the processor further comprises:

calculating state costs incurred when the coding process is turned on in a scale factor band;

calculating a total cost for each of the plurality of paths based on the state costs, the time transition costs, and the frequency transition costs; and selecting the path from the plurality of paths with a minimum total cost.

18. The article of manufacture of claim 14, wherein the coding process is Intensity Stereo coding.

* * * * *